(12) United States Patent
Belling et al.

(10) Patent No.: US 12,466,376 B2
(45) Date of Patent: Nov. 11, 2025

(54) SWITCHING DEVICE FOR A BRAKE SYSTEM FOR A VEHICLE, BRAKE SYSTEM WITH A SWITCHING DEVICE AND METHOD FOR OPERATING A SWITCHING DEVICE

(71) Applicant: Knorr-Bremse Systeme Fuer Nutzfahrzeuge GmbH, Munich (DE)

(72) Inventors: Michael Belling, Renningen (DE); Christian Kaufmann, Sindelfingen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 705 days.

(21) Appl. No.: 17/771,791

(22) PCT Filed: Oct. 13, 2020

(86) PCT No.: PCT/EP2020/078712
§ 371 (c)(1),
(2) Date: Apr. 25, 2022

(87) PCT Pub. No.: WO2021/083659
PCT Pub. Date: May 6, 2021

(65) Prior Publication Data
US 2022/0371565 A1    Nov. 24, 2022

(30) Foreign Application Priority Data
Oct. 30, 2019  (DE) .................... 10 2019 129 305.7

(51) Int. Cl.
*B60T 13/66*  (2006.01)
*B60T 8/17*  (2006.01)
(Continued)

(52) U.S. Cl.
CPC .......... *B60T 13/662* (2013.01); *B60T 8/1708* (2013.01); *B60T 8/885* (2013.01); *B60T 8/92* (2013.01);
(Continued)

(58) Field of Classification Search
CPC ...... B60T 13/662; B60T 8/1708; B60T 8/885; B60T 8/92; B60T 2270/406; B60T 2270/413
See application file for complete search history.

(56) References Cited

U.S. PATENT DOCUMENTS

2005/0225165 A1* 10/2005 Naik ................... B60T 8/321
303/20
2005/0228546 A1* 10/2005 Naik ................... B60W 50/023
701/1
(Continued)

FOREIGN PATENT DOCUMENTS

CN       101687498 A     3/2010
CN       104203666 A     12/2014
(Continued)

OTHER PUBLICATIONS

Functional Safety Standard ISO26262-2, Road vehicles—Functional safety—Part 2: Management of functional safety, Second edition Dec. 2018.
(Continued)

*Primary Examiner* — Vishal R Sahni
(74) *Attorney, Agent, or Firm* — NORTON ROSE FULBRIGHT US LLP

(57) ABSTRACT

A switching device for a vehicle brake system, including: a central-control-unit (CCU) for controlling the brake system, at least one subsystem-control-unit (SCU) which is connected/connectable to the CCU via a data bus to control a subsystem device of the brake system and/or a redundant-
(Continued)

control-unit (RDC) which is connected/connectable to the CCU via a further data bus to control a redundant brake system for the brake system; and a monitoring device to read in a first test signal from the CCU to test a function of the CCU and which is configured to read in a second test signal from the SCU to test a function of the SCU and/or to read in a redundant test signal from the RDC to test a function of the RDC. Also described are a related brake system, a method, and a computer readable medium.

17 Claims, 2 Drawing Sheets

(51) Int. Cl.
   *B60T 8/88*     (2006.01)
   *B60T 8/92*     (2006.01)

(52) U.S. Cl.
   CPC ... *B60T 2270/406* (2013.01); *B60T 2270/413* (2013.01)

(56) References Cited

U.S. PATENT DOCUMENTS

| | | | |
|---|---|---|---|
| 2011/0144855 A1 | 6/2011 | Herges et al. | |
| 2016/0114779 A1 | 4/2016 | Binder et al. | |
| 2018/0290642 A1* | 10/2018 | Tschiene | B60T 8/885 |
| 2019/0054909 A1* | 2/2019 | Shah | B60T 8/00 |
| 2020/0070788 A1 | 3/2020 | Michels et al. | |
| 2021/0031741 A1 | 2/2021 | Alford et al. | |
| 2021/0347345 A1* | 11/2021 | Hwang | B60T 13/745 |
| 2022/0144224 A1* | 5/2022 | Tarandek | G05G 5/03 |
| 2022/0234558 A1* | 7/2022 | Schünemann | B60T 8/1766 |

FOREIGN PATENT DOCUMENTS

| | | | | |
|---|---|---|---|---|
| CN | 105555624 A | | 5/2016 | |
| CN | 107097806 A | | 8/2017 | |
| CN | 110914120 A | * | 3/2020 | ............ B60T 13/662 |
| DE | 10236921 A1 | | 3/2004 | |
| DE | 102005014550 A1 | * | 11/2005 | ............. B60T 13/74 |
| DE | 102008029310 A1 | | 1/2010 | |
| DE | 102017209721 A1 | | 10/2018 | |
| WO | 9926821 A1 | | 6/1999 | |

OTHER PUBLICATIONS

Functional Safety Standard ISO26262-2, Road vehicles—Functional safety—Part 5: Product development at the hardware level, Second edition Dec. 2018.

International Search Report issued Nov. 23, 2020 for PCT/EP2020/078712.

* cited by examiner

SWITCHING DEVICE FOR A BRAKE SYSTEM FOR A VEHICLE, BRAKE SYSTEM WITH A SWITCHING DEVICE AND METHOD FOR OPERATING A SWITCHING DEVICE

FIELD OF THE INVENTION

The present approach relates to a switching device for a vehicle brake system, a brake system having a switching device, and a method for operating a switching device.

BACKGROUND INFORMATION

As part of the automated or autonomous driving of all types of vehicles, it is necessary to create redundancies. These redundancies must be configured in such a way that the vehicle cannot be placed in a safety-critical or uncontrollable condition. For example, redundancies can be achieved by configuring systems in duplicate or by linking them to other systems that perform similar functions. In accordance with the specifications of Functional Safety Standard ISO26262-2, microcontrollers of control units must be monitored by an external entity.

SUMMARY OF THE INVENTION

Against this background, the object of this approach is to provide an improved switching device for a vehicle brake system, an improved brake system with a switching device, and an improved method for operating a switching device.

This object may be achieved by a switching device having the features described herein, by a brake system described herein, by a method described herein, and by a computer program described herein.

The advantages achievable with the proposed approach are savings on the costs of additional controllers or integrated circuits with watchdogs for monitoring each individual control unit of a brake system.

A switching device for a brake system for a vehicle comprises a central control unit, at least one subsystem control unit and, in addition or alternatively, a redundant control unit and a monitoring device. The central control unit is configured to control the brake system. The subsystem control unit is connected or can be connected to the central control unit via a data bus and is configured to control a subsystem device of the brake system. The redundant control unit is connected or can be connected to the central control unit via an additional data bus and is configured to control a redundant brake system for the brake system. The monitoring device is configured to read in a first test signal from the central control unit in order to test a function of the central control unit, and to read in a second test signal from the subsystem control unit in order to test a function of the subsystem control unit, and additionally or alternatively to read in a redundant test signal from the redundant control unit in order to test a function of the redundant control unit.

The brake system can be an electronic brake system, or "EBS" for short. The central control unit, the subsystem control unit and additionally or alternatively the redundant control unit, can each have at least one microcontroller. The redundant control unit can be configured functionally identical to the central control unit, for example also identical in configuration. The subsystem can be any type of brake module of the brake system, for example an electropneumatic module or a foot brake module. The redundant brake system can be configured functionally identical to the brake system, for example identical in configuration. The data bus can comprise at least one data line. The monitoring device can be configured to perform at least one watchdog function. The functionality of a "watchdog" can be described in such a way that a counter is provided which increments at each step. When it reaches or overruns a limit, the microcontroller reset function is activated. At runtime, commands are then integrated which reset the watchdog counter. If the program hangs, the watchdog counter is no longer reset and a reset is performed. In the present case, the first test signal can be a signal provided by the central control unit and, additionally or alternatively, the second test signal can be a signal provided by the subsystem control unit or a response signal generated in response to a query signal previously sent by the monitoring device to the central control unit or subsystem control unit. The first test signal can comprise, for example, a measured value, an evaluation result, or a protocol of the central control unit. Likewise, the second test signal can comprise a measured value, an evaluation result or protocol of the subsystem control unit and, additionally or alternatively, the redundancy test signal can comprise a measured value, an evaluation result or protocol of the redundancy control unit. The monitoring device can be configured to check or verify the measured value, the evaluation result or protocol, for example by comparing it with another measured value, evaluation result or protocol in order to detect whether the central control unit and additionally or alternatively the subsystem control unit are functioning as expected.

It is advantageous if such a switching device is configured to monitor the functions of a plurality of control units connected to each other via a data bus, using only one monitoring device. This enables cost savings for the brake system and additionally or alternatively for the redundant brake system.

The monitoring device can be configured to output a first control signal to a component of the brake system using the first test signal, wherein the first control signal indicates the function of the central control unit, and additionally or alternatively to output a second control signal to a component of the brake system using the second test signal, wherein the second control signal indicates the function of the subsystem control unit, and additionally or alternatively to output a redundant control signal to a component of the brake system using the redundant test signal, wherein the redundant control signal indicates the function of the redundant control unit. Depending on the function of the central control unit, the subsystem control unit and additionally or alternatively the redundant control unit, actions can be initiated to ensure or restore the function, or a replacement function can be activated if the test signal indicates, for example, a malfunction of the central control unit, the subsystem control unit and additionally or alternatively the redundant control unit. For example, the respective control signal can cause a restart or power off of a defective control unit and, additionally or alternatively, activate another control unit.

The monitoring device can be implemented in the central control unit and additionally or alternatively in the subsystem control unit. For example, the monitoring device may be arranged in a common housing with the central control unit or the subsystem control unit. The monitoring device can also be arranged on a common hardware component such as a printed circuit board of the central control unit and additionally or alternatively of the subsystem control unit.

It is also advantageous if the monitoring device is arranged outside of the central control unit and the subsystem control unit according to one embodiment. This means that the monitoring device can be implemented in an additional control unit of the brake system.

The monitoring device can be implemented in the redundant control unit in accordance with one embodiment. For example, the monitoring device can be arranged in a common housing with the redundant control unit. The monitoring device can also be arranged on a common hardware component such as a printed circuit board of the redundant control unit. An arrangement of the monitoring device in or on the redundant control unit thus makes it possible to advantageously monitor both the brake system and the redundant brake system.

According to one embodiment, the central control unit can be connected or connectable for signal communication to at least one sensor and additionally or alternatively actuator of the brake system and, additionally or alternatively, electrically connected to an operating voltage terminal and additionally or alternatively to a ground terminal, and additionally or alternatively the redundant control unit can be connected or connectable for signal communication to at least the sensor and additionally or alternatively actuator and, additionally or alternatively, electrically connected to a further operating voltage terminal and additionally or alternatively to a further ground terminal. Thus, the central control unit and the redundant control unit can obtain values from the same sensor and additionally or alternatively the same actuator, which values can then be checked, for example compared, by the monitoring device.

The central control unit can be connected or connectable to at least the subsystem control unit via an electrically conductive connecting device. This allows the control units to be supplied with electrical power.

It is also advantageous if, according to one embodiment, the switching device has at least one second subsystem control unit which is or can be connected to the central control unit and additionally or alternatively to the subsystem control unit via at least one second data bus to control a second subsystem device of the brake system, wherein the monitoring device is configured to read in a third test signal from the second subsystem control unit in order to check a function of the second subsystem control unit. The second subsystem device can also be any type of brake module of the brake system. This means that multiple subsystem control units can be checked by the monitoring device, which saves additional costs.

The subsystem control unit may be configured to control the subsystem device, which is formed as an electropneumatic module or a foot brake module of the brake system. The electropneumatic module can be a single-channel or two-channel electropneumatic module.

Likewise, the second subsystem control unit can be configured to control the second subsystem device, which is formed as an electropneumatic module or a foot brake module of the brake system. Here, also, the electropneumatic module can be a single-channel or two-channel electropneumatic module.

A brake system comprises one of the switching devices described above. The brake system can be or comprise a redundant brake system, with the switching device being implemented in the redundant brake system. Such a brake system can advantageously function with only one monitoring device, which can nevertheless safely monitor all control units of the brake system and additionally or alternatively the redundant braking system.

A method for operating a switching device for a brake system for a vehicle comprises a reading-in step and an outputting step. In the reading-in step a first test signal is read in from a central control unit configured to control the brake system and additionally or alternatively a second test signal is read in from a subsystem control unit, which is connected to the central control unit via a data bus and configured to control a subsystem device of the brake system, and additionally or alternatively a redundant test signal is read in from a redundant control unit, which is connected or can be connected to the central control unit via a further data bus and configured to control a redundant brake system for the brake system. In the outputting step, a first control signal is output to a component of the brake system using the first test signal, wherein the first control signal indicates the function of the central control unit, and additionally or alternatively a second control signal is output to a component of the brake system using the second test signal, wherein the second control signal indicates the function of the subsystem control unit, and additionally or alternatively a redundant control signal is output to a component of the brake system using the redundant test signal, wherein the redundant control signal indicates the function of the redundant control unit.

This method can be implemented using the monitoring device presented above. The advantages of the monitoring device described above can also be realized in a technically simple and cost-effective manner by such a method.

Exemplary embodiments of the approach presented here are explained in more detail in the following description with reference to the figures.

In the following description of advantageous exemplary embodiments of the present approach, identical or similar reference signs are used for elements shown in the various figures which have similar functions, wherein no repeated description of these elements is given.

BRIEF DESCRIPTIONS OF THE DRAWINGS

DETAILED DESCRIPTION

Figure 1:
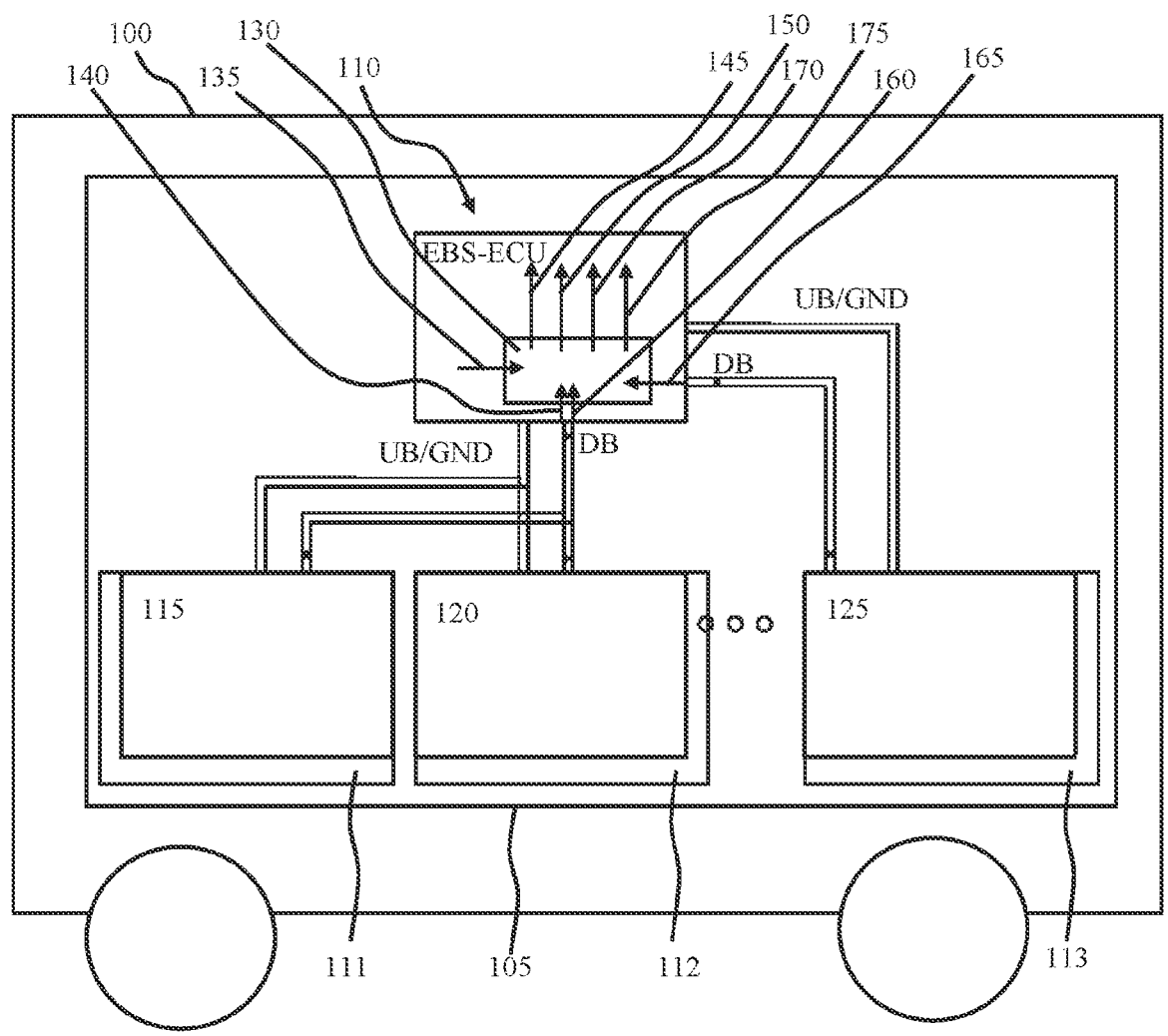
FIG. 1 shows a schematic illustration of a vehicle having a brake system with a switching device in accordance with one exemplary embodiment.

FIG. 1 shows a schematic illustration of a vehicle 100 having a brake system 105 with a switching device 110 in accordance with one exemplary embodiment.

According to this exemplary embodiment, the brake system 105 is formed as an electronic brake system, "EBS" for short, or according to an alternative embodiment as an anti-lock braking system, "ABS" for short. According to this exemplary embodiment, the brake system 105 has at least one subsystem device 111, 112, 113 for implementing a braking operation. Purely as an example, the brake system 105 according to this exemplary embodiment has three of the subsystem devices 111, 112, 113, which according to this exemplary embodiment are formed as a single-channel electropneumatic module, a two-channel electropneumatic module and/or a foot brake module. According to an alternative exemplary embodiment, the brake system 105 has an arbitrary number of other subsystem devices of arbitrary type.

The switching device 110 has a central control unit EBS-ECU, at least one subsystem control unit 115, 120, 125, and a monitoring device 130. The central control unit EBS-ECU and each of the subsystem control units 115, 120, 125 have a microcontroller each. The central control unit EBS-ECU is configured to control the brake system 105. The subsystem control unit 115, 120, 125 is connected or can be connected to the central control unit EBS-ECU via a data bus DB and is configured to control the subsystem device 111, 112, 113 of the brake system 105. The monitoring device 130 is configured to read in a first test signal 135 from the central control unit EBS-ECU in order to test a function of the central control unit EBS-ECU and configured to read in a second test signal 140 from the subsystem control unit 115 in order to test a function of the subsystem control unit 115.

The monitoring device 130 can also be called a "watchdog" and in accordance with this exemplary embodiment is configured to perform at least one watchdog function. According to one exemplary embodiment, the first test signal 135 is a signal provided by the central control unit EBS-ECU and/or the second test signal 140 is a signal provided by the subsystem control unit 115 or, according to an alternative exemplary embodiment, is a response signal generated in response to a query signal previously sent by the monitoring device 130 to the central control unit EBS-ECU or subsystem control unit 115. According to this exemplary embodiment, the first test signal 135 comprises a measured value, an evaluation result or protocol of the central control unit EBS-ECU. The second test signal 140 in accordance with this exemplary embodiment also comprises a measured value, an evaluation result or protocol of the subsystem control unit 115. According to this exemplary embodiment the monitoring device 130 is configured to check or verify the measured value, the evaluation result or protocol, for example by comparing it with another measured value, evaluation result or protocol in order to detect whether the central control unit EBS-ECU and/or the subsystem control unit 115 are functioning as expected.

Purely by way of example, the monitoring device 130 in accordance with this exemplary embodiment is implemented in the central control unit EBS-ECU, and/or in accordance with an alternative embodiment in one of the subsystem control units 115, 120, 125. According to this exemplary embodiment, the monitoring device 130 is arranged in a common housing with the central control unit EBS-ECU or, in accordance with the alternative exemplary embodiment, in a common housing with the subsystem control unit 115, 120, 125. In accordance with this exemplary embodiment, the monitoring device 130 is arranged on a common hardware component, such as a printed circuit board of the central control unit EBS-ECU and/or subsystem control unit 115, 120, 125.

The monitoring device 130 in accordance with this exemplary embodiment is also configured to output, using the first test signal 135, to a component of the brake system 105 a first control signal 145 that indicates the function of the central control unit EBS-ECU and/or, using the second test signal 140, to output to a component of the brake system 105 a second control signal 150 that indicates the function of the subsystem control unit 115.

The switching device 110 in accordance with this exemplary embodiment has at least one second subsystem control unit 120 which is or can be connected to the central control unit EBS-ECU and/or the subsystem control unit 120 via at least one second data bus DB to control the second subsystem device 112 of the brake system 105, wherein the monitoring device 130 is configured to read in a third test signal 160 from the second subsystem control unit 120 in order to check a function of the second subsystem control unit 120. The switching device 110 in accordance with this exemplary embodiment has at least one third subsystem control unit 125 which is or can be connected to the central control unit EBS-ECU and/or the subsystem control unit 120 via at least one third data bus DB to control the third subsystem device 113 of the brake system 105, wherein the monitoring device 130 is configured to read in a fourth test signal 165 from the third subsystem control unit 125 in order to check a function of the third subsystem control unit 125. The monitoring device 130 in accordance with this exemplary embodiment is also configured to output, using the third test signal 160, to a component of the brake system 105 a third control signal 170 that indicates the function of the second subsystem control unit 120 and/or, using the fourth test signal 165, to output to a component of the brake system 105 a fourth control signal 175 that indicates the function of the third subsystem control unit 125.

The central control unit EBS-ECU in accordance with this exemplary embodiment is connected or can be connected to at least the subsystem control unit 115, 120, 125 via an electrically conductive connecting device UB/GND.

The switching device 110 presented here implements ISO26262 conformance by a central watchdog for a distributed electrical system. The switching device 110 advantageously optimizes a separate monitoring function of a control unit EBS-ECU, 115, 120, 125, which can communicate with other control units EBS-ECU, 115, 120, 125 in a system via data lines, here via data buses DB. In principle, control units EBS-ECU, 115, 120, 125 are currently being developed in accordance with the specifications of the Functional Safety Standard ISO26262-2. According to the standard, the internal microcontroller of the control unit EBS-ECU, 115, 120, 125 must be monitored via a second entity. This second entity is implemented by the monitoring device 130 which, in accordance with one exemplary embodiment, enables an operation or verifies calculations by a "handshake" signal by calculating the same task performed by the internal microcontroller, and in accordance with one exemplary embodiment comparing a result of the internal microcontroller with a result of the monitoring device 130 and then enabling it accordingly. The control signals 145, 150, 170, 175 can be such "handshake" signals.

A second controller, hereinafter also referred to as "µC", or an integrated circuit, or "IC" for short, with an integrated watchdog per control unit EBS-ECU, 115, 120, 125, is advantageously not necessary to perform such a monitoring function, due to the monitoring device 130. The switching device 110 thus enables high costs to be saved for either at least one second controller or an IC with watchdog.

In order to optimize the monitoring function in the brake system 105, in the switching device 110 presented here a watchdog functionality has been implemented in the central control unit EBS-ECU, wherein the subsystem control units 115, 120, 125 of the subsystem devices 111, 112, 113 make use of the watchdog functionality. This is possible because these perform a constant exchange of data over the data bus DB, here a CAN-BUS (Controller Area Network bus). According to an alternative exemplary embodiment, the watchdog functionality is performed by one of the attached subsystem devices 111, 112, 113 or a redundant system as described in FIG. 2. In any case, the IC and/or controller component, which implements the watchdog functions, can be omitted from one or more control units EBS-ECU, 115, 120, 125.

Figure 2:
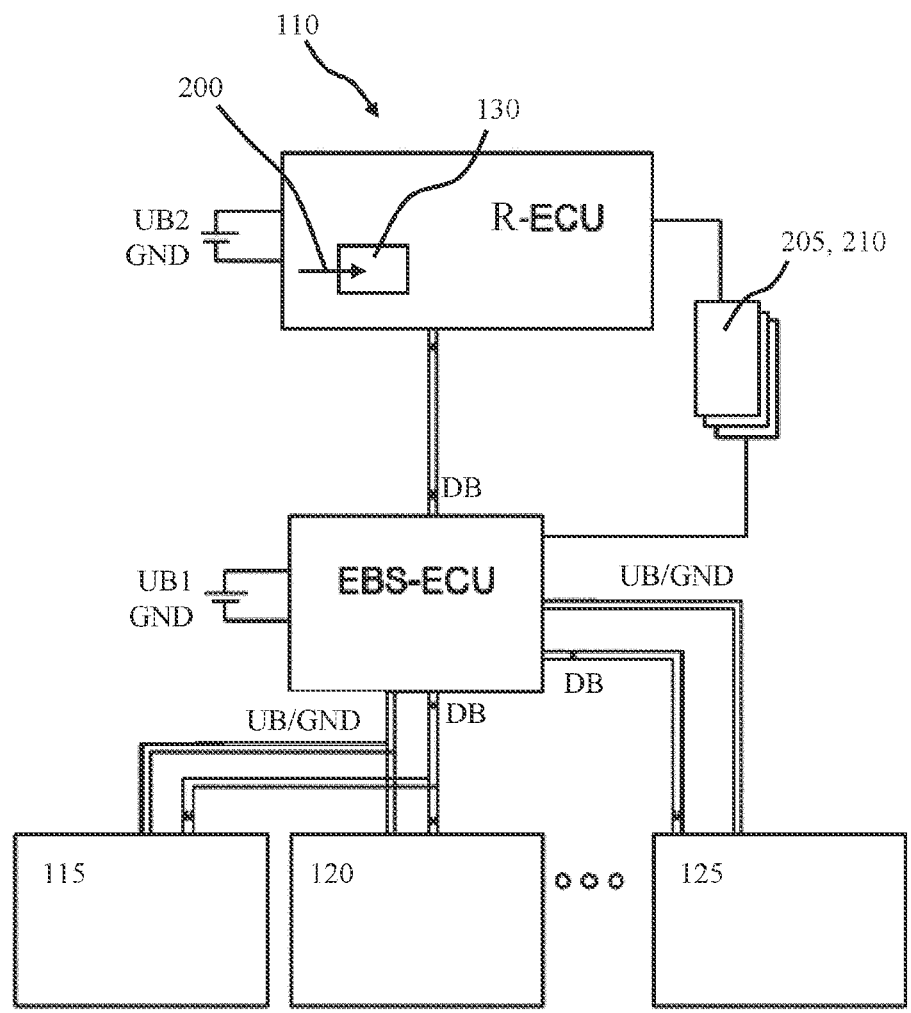
FIG. 2 shows a schematic illustration of a switching device in accordance with one exemplary embodiment.

FIG. 2 shows a schematic illustration of a switching device 110 in accordance with one exemplary embodiment. This can be the switching device 110 described with reference to FIG. 1, except that according to this exemplary embodiment the monitoring device 130 is arranged outside of the central control unit EBS-ECU and the at least one subsystem control unit 115, 120, 125.

In accordance with this exemplary embodiment, the switching device 110, in addition to or as an alternative to the at least one or the subsystem control units 115, 120, 125, has a redundant control unit R-ECU in which the monitoring device 130 is implemented, purely as an example in accordance with this exemplary embodiment. According to an alternative exemplary embodiment, the monitoring device 130 is implemented in the central control unit EBS-ECU as described in FIG. 1. The redundant control unit R-ECU is connected or can be connected to the central control unit EBS-ECU via an additional data bus DB and is configured to control a redundant brake system of the same or similar configuration for the brake system or an electronic parking brake. According to one exemplary embodiment, the redundant control unit R-ECU is configured to be functionally identical to the central control unit EBS-ECU.

According to this exemplary embodiment, the monitoring device 130 is configured to read a redundant test signal 200 from the redundant control unit R-ECU in order to check a function of the redundant control unit R-ECU. The monitoring device 130 according to this exemplary embodiment is configured, using the redundant test signal 200, to output to a component of the brake system a redundant control signal indicating the function of the redundant control unit R-ECU. The monitoring device 130 according to this exemplary embodiment is also configured to read in the first, second, third and/or fourth test signal via the additional data bus DB.

The central control unit EBS-ECU according to this exemplary embodiment is connected or can be connected for signal communication to at least one sensor 205 and/or actuator 210 of the brake system and/or is or can be electrically connected to an operating voltage terminal UB1 and/or a ground terminal GND. According to this exemplary embodiment, the redundant control unit R-ECU is or can also be connected for signal communication to at least the sensor 205 and/or actuator 210 and/or is or can be electrically connected to an additional operating voltage terminal UB2 and/or an additional ground terminal GND.

To implement redundancy for systems such as the electrical brake system EBS or ABS, multiple instances of these systems can be placed in the vehicle. Another possibility is to supplement the system with similar subsystems that can provide the functionality. An example of this is to couple an EBS with an electronic parking brake, or "EPB" for short. In the event of a fault, the faulty system is switched off and the second fault-free system then takes over the task and thus establishes the redundancy. These two systems are independent of each other. They are each developed according to the principle of functional safety and thus possess extensive self-monitoring. Both systems are connected to each other by a bus system and shared actuators and are used to exchange states and data.

Multiple placement of control units or systems in vehicles involves high costs. This approach describes a way to reduce the cost of an existing system using redundant systems.

According to this exemplary embodiment, the principle of the "shared" watchdog is transferred to a system that is redundantly configured.

In this exemplary embodiment, the monitoring function is performed by the redundant control unit R-ECU. According to this exemplary embodiment, this is connected to the central control unit EBS-ECU by data buses DB as well as shared actuators 205 and sensors 210, which according to one exemplary embodiment are used for synchronization. For example, a protocol can be transmitted from the central control unit EBS-ECU via the shared PCV valve using test pulses to the redundant control unit R-ECU, which is controlled via the data bus DB. This can also be used as a "shared" watchdog.

Figure 3:
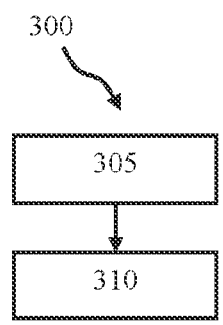
FIG. 3 shows a process flow diagram of a method for operating a switching device for a brake system for a vehicle in accordance with one exemplary embodiment.

FIG. 3 shows a process flow diagram of a method 300 for operating a switching device for a brake system for a vehicle in accordance with one exemplary embodiment. This method 300 can be controlled or executed by the switching devices described in one of FIG. 1 or 2. In particular, in this context the facility for resetting at least one of the switching devices may also be provided.

The method 300 has a reading-in step 305 and an outputting step 310. In the reading-in step 305 a first test signal is read in from a central control unit configured to control the brake system and/or a second test signal is read in from a subsystem control unit, which is connected to the central control unit via a data bus and configured to control a subsystem device of the brake system, and/or a redundant test signal is read in from a redundant control unit, which is connected to the central control unit via a further data bus and configured to control a redundant brake system for the brake system. In the outputting step 310, a first control signal is output to a component of the brake system using the first test signal, wherein the first control signal indicates the function of the central control unit, and/or a second control signal is output to a component of the brake system using the second test signal, wherein the second control signal indicates the function of the subsystem control unit, and/or a redundant control signal is output to a component of the brake system using the redundant test signal, wherein the redundant control signal indicates the function of the redundant control unit.

The method steps presented here can be repeated and performed in a different order than the one described.

If an exemplary embodiment comprises an "and/or" association between a first and a second feature, this should be read as meaning that the exemplary embodiment according to one embodiment has both the first feature and the second feature and in accordance with another exemplary embodiment, it has either only the first or only the second feature.

THE LIST OF REFERENCE SIGNS IS AS FOLLOWS

DB data bus
EBS-ECU central control unit
GND ground terminal
R-ECU redundant control unit
UB/GND electrically conductive connection device
UB1 operating voltage terminal
UB2 additional operating voltage terminal
100 vehicle
105 brake system
110 switching device
111 subsystem device
112 second subsystem device
113 third subsystem device 115 subsystem control unit
120 second subsystem control unit
125 third subsystem control unit
130 monitoring device
135 first test signal
140 second test signal
145 first control signal
150 second control signal
160 third test signal
165 fourth test signal
170 third control signal
175 fourth control signal
200 redundant test signal
205 sensor
210 actuator
300 method for operating a switching device for a brake system for a vehicle
305 reading-in step
310 outputting step

The invention claimed is:

1. A switching device for a brake system for a vehicle, comprising:
a central control unit for controlling the brake system,
a redundant control unit which is connected or is connectable to the central control unit via a data bus to control a redundant brake system which is redundant to and independent of the brake system; and
a single monitoring device to read in both: (a) a first test signal from the central control unit to test a function of the central control unit, and (b) a redundant test signal from the redundant control unit to test a function of the redundant control unit;
wherein the first test signal includes a measured value, an evaluation result or a protocol of the central control unit, and the redundant test signal includes a measured value, an evaluation result or a protocol of the redundant control unit, and
wherein the monitoring device is configured to check or verify the measured value or the evaluation result or the protocol of the first test signal, by comparing it with another measured value or another evaluation result or another protocol to detect whether the central control unit is functioning as expected, and the monitoring device is further configured to check or verify the measured value or the evaluation result or the protocol of the redundant test signal by comparing it with a third measured value or third evaluation result or a third protocol to detect whether the redundant control unit is functioning as expected.

2. The switching device of claim 1, wherein the monitoring device is configured to output a first control signal to a component of the brake system using the first test signal, wherein the first control signal indicates the function of the central control unit, and/or to output a redundant control signal to a component of the brake system using the redundant test signal, wherein the redundant control signal indicates the function of the redundant control unit.

3. The switching device of claim 1, wherein the monitoring device is implemented in the redundant control unit.

4. The switching device of claim 1, wherein the central control unit is connected or is connectable for signal communication to at least one sensor and/or actuator of the brake system and/or is connected electrically to an operating voltage terminal and/or a ground terminal and/or the redundant control unit is connected or is connectable for signal communication to at least the sensor and/or actuator and/or connected electrically to a further operating voltage terminal and/or a further ground terminal.

5. The switching device of claim 1, wherein the brake system is an EBS and the redundant brake system is another instance of an EBS.

6. The switching device of claim 1, wherein the brake system is an ABS and the redundant brake system is another instance of an ABS.

7. The switching device of claim 1, wherein the brake system is an EBS brake system and the redundant brake system is an electronic parking brake.

8. The switching device according to claim 1, further comprising:
at least one subsystem control unit which is connected or is connectable to the central control unit via a further data bus to control a subsystem device of the brake system;
wherein the monitoring device is further configured to read in a second test signal from the subsystem control unit to test a function of the subsystem control unit; and
wherein the second test signal includes a measured value of the subsystem control unit or an evaluation result of the subsystem control unit or a protocol of the subsystem control unit, and
wherein the monitoring device is configured to check or verify the measured value or the evaluation result or the protocol of the second test signal, by comparing it with a third measured value, or a third evaluation result or a third protocol to detect whether the subsystem control unit is functioning as expected.

9. The switching device of claim 8, wherein the monitoring device is configured to output a second control signal to a component of the brake system using the second test signal, wherein the second control signal indicates the function of the subsystem control unit.

10. The switching device of claim 8, wherein the monitoring device is implemented in the central control unit and/or the subsystem control unit.

11. The switching device of claim 8, wherein the monitoring device is arranged outside of the central control unit and the subsystem control unit.

12. The switching device of claim 8, wherein the central control unit is connected or is connectable to at least the subsystem control unit via an electrically conductive connecting device.

13. The switching device of claim 8, further comprising:
at least one second subsystem control unit which is connected or is connectable to the central control unit and/or the subsystem control unit via at least one second data bus to control a second subsystem device of the brake system, wherein the monitoring device is configured to read in a third test signal from the second subsystem control unit in order to check a function of the second subsystem control unit.

14. The switching device of claim 8, wherein the subsystem control unit is configured to control a subsystem device that is formed as an electropneumatic module or a foot brake module of the brake system.

15. A brake system, comprising:
a switching device, including:
a central control unit for controlling the brake system,
a redundant control unit which is connected or is connectable to the central control unit via a data bus to control a redundant brake system which is redundant to and independent of the brake system; and
a single monitoring device to read in both: (a) a first test signal from the central control unit to test a function of the central control unit, and (b) a redundant test signal from the redundant control unit to test a function of the redundant control unit;

wherein the first test signal includes a measured value, an evaluation result or a protocol of the central control unit, and the redundant test signal includes a measured value, an evaluation result or a protocol of the redundant control unit, and wherein the monitoring device is configured to check or verify the measured value or the evaluation result or the protocol of the first test signal, by comparing it with another measured value or another evaluation result or another protocol to detect whether the central control unit is functioning as expected, and the monitoring device is further configured to check or verify the measured value or the evaluation result or the protocol of the redundant test signal by comparing it with a third measured value or third evaluation result or a third protocol to detect whether the redundant control unit is functioning as expected.

16. A method for operating a switching device for a brake system for a vehicle, the method comprising:

reading in, by a single monitoring device, both: (a) a first test signal from a central control unit, configured to control the brake system, and a redundant test signal from a redundant control unit, which is connected or is connectable to the central control unit via a data bus and is configured to control a redundant brake system which is redundant to and independent of the brake system; and outputting a first control signal to a component of the brake system using the first test signal, wherein the first control signal indicates the function of the central control unit, and a redundant control signal to a component of the brake system using the redundant test signal, wherein the redundant control signal indicates the function of the redundant control unit;

wherein the first test signal includes a measured value or an evaluation result or a protocol of the central control unit, and the redundant test signal includes a measured value, an evaluation result or a protocol of the redundant control unit, and wherein the monitoring device is configured to check or verify the measured value or the evaluation result or the protocol of the first signal, by comparing it with another measured value or another evaluation result or another protocol to detect whether the central control unit is functioning as expected, and the monitoring device is further configured to check or verify the measured value or the evaluation result or the protocol of the redundant test signal by comparing it with a third measured value or third evaluation result or a third protocol to detect whether the redundant control unit is functioning as expected.

17. A non-transitory computer readable medium having a computer program, which is executable by a processor, comprising:

a program code arrangement having program code for operating a switching device for a brake system for a vehicle, by performing the following:

reading in, by a single monitoring device, both (a) a first test signal from a central control unit, configured to control the brake system, and (b) a redundant test signal from a redundant control unit, which is connected or is connectable to the central control unit via a data bus and is configured to control a redundant brake system which is redundant to and independent of the brake system; and outputting a first control signal to a component of the brake system using the first test signal, wherein the first control signal indicates the function of the central control unit, and/or a redundant control signal to a component of the brake system using the redundant test signal, wherein the redundant control signal indicates the function of the redundant control unit;

wherein the first test signal includes a measured value or an evaluation result or a protocol of the central control unit, and the redundant test signal includes a measured value, an evaluation result or a protocol of the redundant control unit, and wherein the monitoring device is configured to check or verify the measured value or the evaluation result or the protocol of the first test signal, by comparing it with another measured value, another evaluation result or another protocol to detect whether the central control unit is functioning as expected, and the monitoring device is further configured to check or verify the measured value or the evaluation result or the protocol of the redundant test signal by comparing it with a third measured value or third evaluation result or a third protocol to detect whether the redundant control unit is functioning as expected.

* * * * *